UNITED STATES PATENT OFFICE 2,356,861

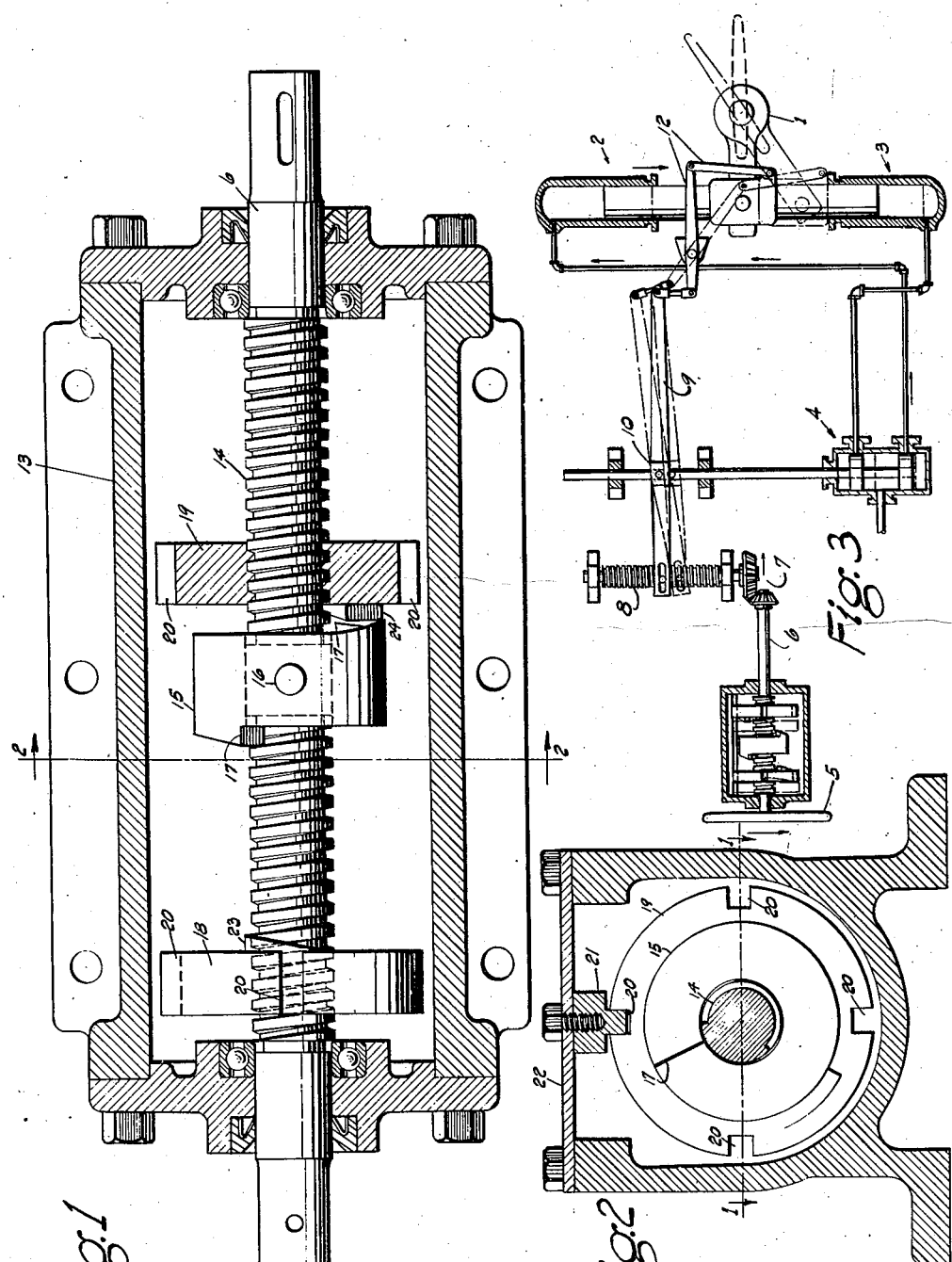

MECHANICAL LIMIT STOP

Harry W. Link, Merion, Pa., assignor to The Baldwin Locomotive Works, a corporation of Pennsylvania Application June 2, 1943, Serial No. 489,590

1 Claim. (Cl. 74—424.8)

This invention relates to a mechanical limit stop control that is particularly adapted for limiting the number of turns in either direction of an input shaft rotation such as a trick wheel of a ship steering apparatus, my device being normally introduced in the steering mechanism between the trick wheel and the stroking gear and being adjusted for input movement limited to a hardover rudder position.

It is an object of my invention to provide an improved limit stop device that is relatively simple and economical in construction, operation and maintenance and is compact and foolproof while at the same time permitting easy and expeditious adjustment of the stopping positions.

Other objects and advantages will be more apparent to those skilled in the art from the following description of the accompany drawing in which:

Fig. 1 is a horizontal sectional view taken substantially on the line 1—1 of Fig. 2 but with certain parts shown in elevation for purposes of clarity;

Fig. 2 is a transverse section taken substantially on the line 2—2 of Fig. 1; and Fig. 3 is a diagrammatic outline of a rudder control system embodying my improved mechanical limit control.

In the specific embodiment of the invention disclosed herein I have shown for purposes of illustration a rudder 1 operated by hydraulic rams and cylinders generally indicated at 2 and 3 for which fluid pressure is controlled by an axially movable valve 4. To initiate axial adjustment of valve 4 a handwheel 5 is secured to and rotates a shaft 6, bevel gears 7 and shaft 8 to cause a floating lever 9 to axially shift the valve 4 through a suitable pivotal connection 10 with the valve stem. The floating lever 9 is connected in turn to the rams through a usual lever and link system 12. As the rams move in response to supply of power thereto a restoring action is transmitted from the rams through the floating lever 9 to return valve 4 to its neutral position and thus hold the rudder in its desired adjusted position. It will, of course, be understood that my mechanical limit control may be employed in any other type of rudder operating and restoring mechanism or in other suitable applications and hence the particular system disclosed herein is to be considered only for purposes of illustration.

The handwheel shaft 6, journalled in a casing 13, has helical threads 14 to which a center nut 15 is secured by a pin 16 extending through the shaft and nut. The opposite faces of this center nut have a pair of shoulders or jaws such as 17 projecting in opposite axial directions but on diametric sides of the screw. A pair of adjustable stop nuts 18 and 19 are threaded on the helical threads and each has a series of peripheral axial slots 20 circumferentially spaced. To prevent these nuts from rotating and yet allow them to move axially along the threaded shaft 6 during rotation thereof, I provide, as shown in Fig. 2, a longitudinally extending key bar 21 secured to a casing cover 22 so as to be removable therewith. This key bar is disposed within the uppermost slots 20 of each nut 18 and 19 whereby upon rotation of the shaft 6 the nuts 18 and 19 will simultaneously move axially on the shaft and accordingly always maintain their same axial spacing between each other. Each of the nuts 18 and 19 has a limit stop shoulder 23 and 24 of such axial depth with respect to the pitch of the helical threads 14 that one revolution of shaft 6 will move the nuts a distance at least equal to the depth of the stop jaws.

In operation, rotation of shaft 6 in a given direction will move nut 18 toward center nut 15 until shoulder 23 engages shoulder 17 or similarly the shoulders of nuts 19 and 15 will move into engagement with each other in case of screw rotation in the opposite direction. The aforementioned axial depth of the shoulders is such that upon reverse rotation these shoulders will clear each other within one revolution of shaft 6. My improved arrangement also permits extremely easy and expeditious adjustment of nuts 18 and 19 merely by removing cover 22 which simultaneously lifts the key bar 21 out of slots 20 whereupon either one or both of nuts 18 and 19 may be angularly adjusted to any desired position along the shaft 6, it only being necessary that some one of the slots 20 terminate in an upper position to receive key bar 21 when cover 22 is replaced. Regardless of the position to which the individual nuts are adjusted one nut will run toward the center nut while the other nut runs away from the center and the final rotation of the shaft will result in full engagement of the nut jaws causing complete stoppage to further rotation of shaft 6.

From the foregoing disclosure, it is seen that I have provided a mechanical limit control that is relatively simple, compact and rugged while still having a high degree of accessibility and easy adjustment.

It will of course be understood that various changes in details of construction and arrangement of parts may be made by those skilled in the art without departing from the spirit of the invention as set forth in the appended claim.

I claim:

A mechanical limit control comprising a helically threaded rotatable shaft, a nut rigidly secured thereto for rotation therewith and having a shoulder thereon, a second nut threaded on said helical thread for relative rotation therewith and having a shoulder for engagement with the shoulder of said first mentioned nut when moved adjacent thereto, a casing containing said shaft and nuts, and means including a cover to which a key bar is secured for slidably engaging said second nut to prevent rotation thereof, whereby removal of the cover automatically removes the key bar to permit rotation of said axially movable nut, the rotation of said shaft causing said second nut to move axially along the shaft until said shoulders engage whereupon further rotation of the shaft is prevented by the inability of said second nut to move axially along said shaft.

HARRY W. LINK.